Oct. 27, 1964         E. A. CARLSON         3,154,247
CONTROL APPARATUS
Filed July 11, 1961
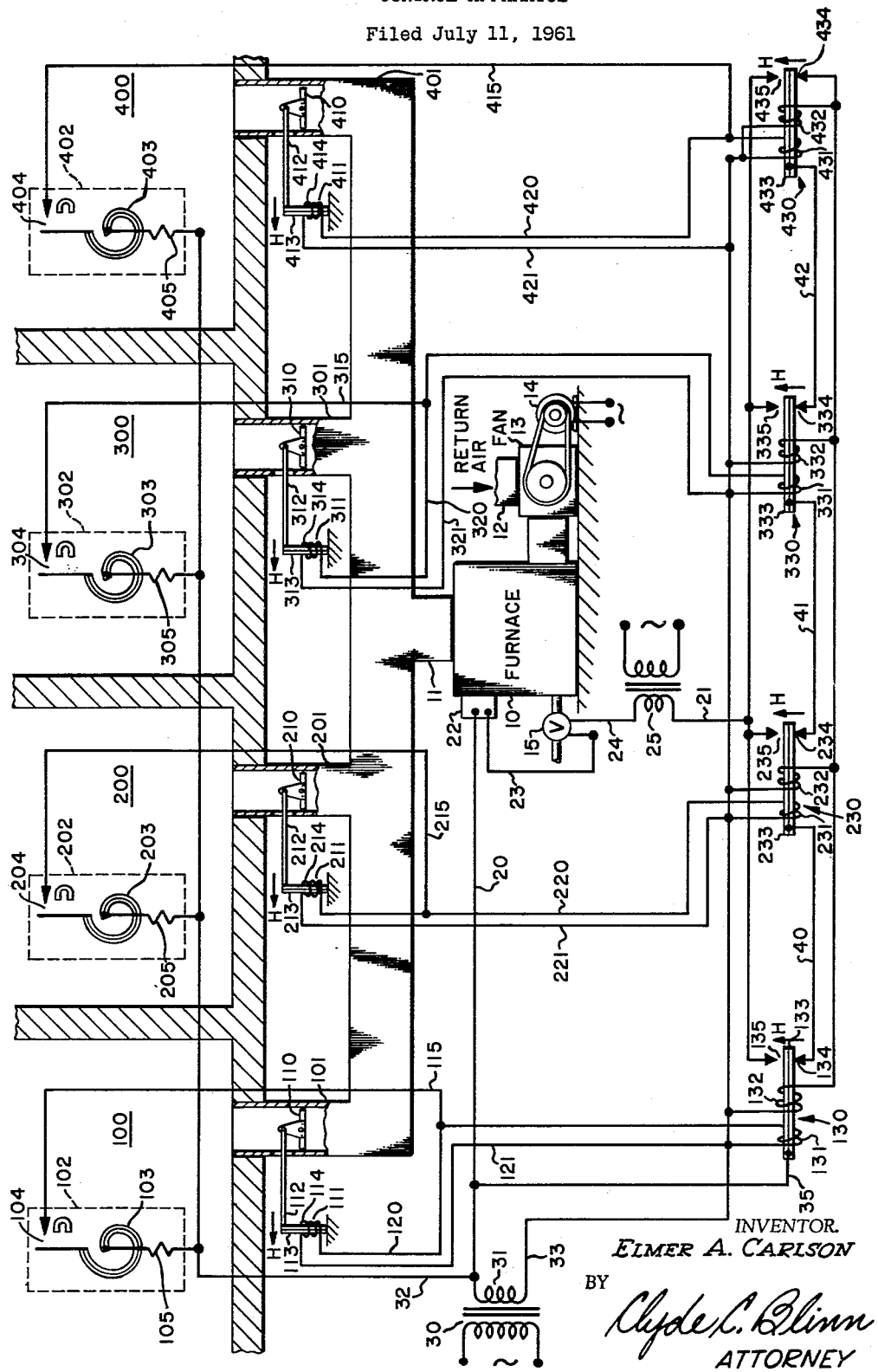
INVENTOR.
ELMER A. CARLSON
BY
Clyde C. Blinn
ATTORNEY

United States Patent Office 3,154,247
Patented Oct. 27, 1964

3,154,247
CONTROL APPARATUS
Elmer A. Carlson, Richfield, Minn., assignor to
Honeywell Inc., a corporation of Delaware
Filed July 11, 1961, Ser. No. 123,161
6 Claims. (Cl. 236—9)

The present invention is concerned with an improved temperature control system for independently controlling the temperature in a number of zones or spaces; in particular, the improvement is in the manner of shifting the authority over the control of the temperature changing device or furnace from one space temperature responsive device to another as the comparative heat load of the spaces change.

In the C. W. Nessell Patent 2,949,234, a zone temperature control apparatus with shifting authority is disclosed. Each of a plurality of spaces have individual thermostats for controlling the operation of a damper in the heat supply duct to the spaces depending upon the heating requirements of each space. The heat output of the furnace is controlled by the thermostat of the space or zone having the greatest heat load, and the transfer of the control of the furnace from one space thermostat to another is made periodically as the heating load of the various spaces change. The Nessell patent is concerned with the broad concept of having the shifting authority; however, since the conception of the Nessell invention, a considerable amount of work has been done to provide a control circuit for accomplishing the broad concept invented by Nessell with a relatively limited number of components to make a system which is economically practicable.

The present invention provides for a plurality of space thermostats for controlling a damper in the inlet duct to each of a number of spaces. A means is provided for controlling the output of the furnace by each of the space or zone thermostats; however, upon the operation of one of the means when the heat load of one of the spaces becomes great enough to cause an operation of the space thermostat, a biasing signal or feedback is provided to affect the other means so the other space thermostat has no control over the furnace until the heat load of another space exceeds the heating load of the first space by some predetermined amount.

An object of the present invention is to provide an improved zone temperature control system with shifting authority wherein thermally operative means is provided for biasing the thermostats of remaining zones out of control when the heating load of a first zone is the greatest.

Another object of the present invention is to provide a zone temperature control apparatus wherein shifting authority from the respective space thermostats is obtained by the thermo relationship on a plurality of thermal operators biased by at least two thermal signals.

These and other objects of the present invention will become apparent upon the study of the following specification and drawing of which A single figure is to show a schematic representation of a zone control system having a plurality of zones with thermostats therein for controlling the supply of heated air to the individual spaces and allowing the space thermostat of the space having the greatest heat load to control the furnace.

Referring to the single figure, a furnace or temperature conditioning apparatus 10 supplies a source of conditioned medium or heated air through a duct 11. Air is returned to the furnace through a return duct 12 under the force of a fan 13 powered by a conventional motor 14 connected to a source of power. Furnace 10 receives a supply of fuel from a source through a valve 15. Valve 15 is energized when conductors 20 and 21 are connected together by some associated circuit. The circuit can be traced as follows: conductor 20, a conventional limit control 22 which provides an open circuit when the temperature in the furnace exceeds some predetermined value, a conductor 23, valve 15, a conductor 24, a secondary winding 25 of a transformer connected to a source of power, and back to conductor 21.

Duct 11 is connected to a plurality of spaces 100, 200, 300 and 400 by parallel connected ducts 101, 201, 301 and 401, respectively. As the heated medium or air flows to the spaces through the respective ducts, a conventional return air duct from the spaces would be used to return the air to duct 12.

Space or zone 100 has a space temperature responsive means or thermostat 102 which comprises a bimetal 103 which closes a switch 104 in response to the temperature of space 100. The thermostat contains a heater 105 which heats the bimetal 103 when switch 104 is closed for heat anticipation purposes to obtain a cycling operation of switch 104. The total close time of switch 104 depends upon the heating load of space 100.

Mounted in duct 101 is a flow control means or damper 110. Damper 110 is controlled by a damper motor 111 connected to the damper 110 by an appropriate linkage 112. The damper motor comprises a bimetal 113 which upon being heated by the heat of a resistance winding 114 moves to the left to open damper 110. A source of power 30 provides the power to damper motor 111 so that upon the closing of switch 104 of the space thermostat, the motor is energized through a circuit traced as follows: from a secondary winding 31 of source of power 30, a conductor 32, heater 105, bimetal 103, switch 104, a conductor 115, a conductor 120, winding 114, a conductor 121, and back to the secondary through a conductor 33.

A thermal switch actuator or operator 130 has two energization windings or resistance heaters 131 and 132. When the windings 131 and/or 132 are energized, a bimetal switch member 133 moves upward to open a switch 134 and close a switch 135 if the temperature resulting from the combined heat output exceeds a predetermined value. Winding 131 is connected in parallel with winding 114 to be energized simultaneously with the energization of winding 114 each time switch 104 of the thermostat closes.

The remaining zones or spaces 200, 300 and 400 have similar damper motors and thermal actuators which are numbered with the series of numbers corresponding with the space number for convenience of explanation. For example, damper motor 211 controls the operation of damper 210 in duct 201, and thermal switch actuator 230 controls the operation of switch 234 and 235. A similar corresponding relationship exists for the remaining apparatus associated with spaces or zones 300 and 400.

The circuit between conductors 20 and 21 which provides for the operation of valve 15 is made up of a parallel connection of the switches 135, 235, 335, and 435. The circuit is traced as follows: from conductor 20, a conductor 35, bimetal 133, switch 134, a conductor 40, bimetal 233, a conductor 41, bimetal 333, a conductor 42, and bimetal 433. When any one of the four bimetals, 133, 233, 333 or 433 are heated to close their respective switches 135, 235, 335, 435, a circuit to short conductors 20 and 21 is provided.

Energization windings or heaters 132, 232, 332 and 432 are cycler heaters for the respective thermal switch actuators 130, 230, 330 and 430. The cycler heaters are connected to a source of power through a circuit comprising the series connection of switches 134, 234, 334 and 434. When all of the four mentioned switches are closed, heat is supplied to the cycler windings of each of the switch actuators. When one of these switch actuators moves to open at least one of the switches 134, 234, 334 or 434, the energization circuits for all of the cycler windings 132, 232, 332 and 432, is broken.

*Operation*

As shown in the single figure, the thermostats of the four zones or spaces are satisfied, and the respective switches 104, 204, 304 and 404 are open. The zone dampers are in a closed position, and fuel valve 15 of the furnace is de-energized. The windings or heaters 131, 231, 331 and 431 of the respective switch actuators are de-energized; however, cycler heaters 132, 232, 332 and 432 are energized through the closed switches 134, 234, 334 and 434 of the respective switch actuators. The heat from cycler heater winding 132 is not sufficient to cause the bimetal 133 to move upward to open the switch 134. The same type of operation exists for the other switch actuators; therefore, none of the switches 135, 235, 335 or 435 will be closed and the furnace will remain inoperative.

Upon a call for heat by one of the zones, such as zone 100, the thermostat would close switch 104 to energize both heater 114 and heater 131. Since thermostat 102 is a cycling type thermostat which is brought about by the anticipation heater 105, the percent on or closed time of switch 104 would depend upon the heating load of space 100. The average energization of the heaters 114 and 131 would produce a heat to the bimetals to cause the bimetals to assume some position in a modulating manner. The position would modulate depending upon the heating load of the space 100. As the heat to bimetal 133 increased due to the addition of the heat from heater 131, switch 134 would open and switch 135 would close. Switch 135 would bring about the energization of valve 15 to provide heated air for space 100.

Immediately upon the opening of switch 134, the energization circuit for the cycler heaters 132, 232, 332 and 432 would be broken to cause the heat level of the bimetals associated therewith to be reduced. If the heat level of the other heaters 231, 331 and 431 are not sufficient to cause the switch actuators to move to a position to open switches 234, 334, and 434 before actuator 130 is operated, the reduction of heat level due to the de-energization of the bias heaters would even more cause the switch actuators 230, 330 and 430 to be even more thermally biased in the position as shown. The cycler heaters insure that once thermostat 102 of space 100 takes over control of the energization of valve 15, the other space thermostats are placed in a position to not control the furnace but only control the position of the respective zone or space dampers 211, 311 and 411.

Let us assume that later in the operation another zone, such as zone 300, has an increase in heating load, the cycling rate of thermostat 302 would increase. Once the heat output of heater 331 reached a level so the average temperature of bimetal 333 increased above a predetermined value, the bimetal would open switch 334. Thermostat 302 would then take over control of the furnace or valve 15. The transfer from thermostat 102 to thermostat 302 would be a rather definite transfer, but the transfer operation would be such that once thermostat 302 was in a position to take over control, the transfer would not be made back to the other thermostat without a definite change in the level of the heating load in the spaces.

To explain the transfer between thermostat 102 and 302, the cycling pattern of the thermostats must be taken into consideration. Since thermostat 102 would be cycling at a rate to provide a closed circuit of switch 104 for a predetermined amount of time, the output of heater 131 would be such to modulate and maintain bimetal 133 in an upward position for a predetermined amount of the total time. Bimetal 133 would also be modulating up and down. Heater 132 would be energized some of the time if we assume that all of the other switches 234, 334 and 434 were closed. The additional heat provided by cycler heater 132 would help to keep thermostat 102 in control through the switch actuator 130. If switch actuator 330 was moved to open switch 334 during the period when switch actuator 130 had closed switch 134, the output of heater 132 would not be available to maintain the definite heat needed to keep switch actuator or thermostat 102 in control of the valve 15. As soon as the heating load of zone 300 reached a level greater than zone 100, the thermostat 302 would take over the control of valve 15 through switch 335 of actuator 330. Once the switch actuator 330 took over the control, switch 334 would control the cycler heater 132 of switch actuator 130 to bias switch actuator 130 so thermostat 102 would not control valve 15.

During the time when one thermostat, such as 300, has control over the furnace output through valve 15, the other zones can obtain as much heat as possible by the modulatingly controlling the respective dampers; however, as soon as the heating load of another zone reaches a level where the zone cannot obtain sufficient heat with the zone damper wide open, the heat level of the associated thermal switch actuator would then be in a position to take over control from the other primary controlling thermostat as did thermostat 302 when the heating load of zone 300 increased above the heating load 100.

The present invention has been described in one particular manner and shown in a specific drawing; however, the intention is to limit the invention only by the scope of the claims of which I claim:

1. In a zone control system for controlling the temperature in a plurality of zones, a furnace for supplying heated air, air duct means connecting said furnace to each of the zones, control means for controlling the supply of fuel to said furnace, a plurality of flow control means, means mounting one of said flow control means in each of said air duct means supplying air to each zone, a plurality of actuators having an electrical energization circuit, means connecting one of said actuators to each of said flow control means whereby said flow control means is opened when said energization circuit is energized, a plurality of bimetal actuators a plurality of switches each having normally open and normally closed contacts, means connecting each of said actuators to one of said switches, said bimetals having a first and a second electrical heater whereby said switch is operated when the temperature of said bimetal is increased to a predetermined temperature, a source of power, a plurality of zone temperature responsive switch means, said switch means being located in said zones to provide a closed circuit for a percent of the total time depending upon the heat load of said space circuit means for each zone connecting said first heater of said bimetal and said energization circuit of said actuator in a series circuit with said zone temperature responsive switch means of each zone to said source of power so that upon a call for heating by one of said zone responsive means said bimetal and said flow control actuator of said one zone are energized, circuit means connecting all of said normally open contacts in parallel with said control means to said source of power whereby upon one of said responsive means calling for heat, said respective bimetal is heated to a temperature less than said predetermined temperature, and circuit means including said normally closed contacts connected in series to control the energization of said second heaters of all of said bimetal switch means whereby each bimetal receives additional heat which is added to the heat of said first heater to bring said bimetal temperature above said predetermined temperature to operate said bimetal actuator.

2. In a zone control system for controlling the temperature in a plurality of zones, a furnace for supplying heated air, duct means connecting said furnace to each of the zones, control means controlling the supply of fuel to said furnace, a plurality of flow control means, means connecting one of said flow control means in each of said duct means supplying air to each zone, a plurality of actuators, means connecting one of said actuators to each of said flow control means whereby said flow control means is opened when said actuator is energized, a plurality of bimetal operated switches each having a normally open and a normally closed contact, said bimetals having a first and a second electrical heater whereby said switch is operated when the temperature of said bimetal is increased to a predetermined temperature, a source of power, a plurality of zone temperature responsive switch means, said switch means being located in said zones to provide a closed circuit when the temperature of said zone is below a selected value, each of said responsive switch means having means associated therewith to provide an on-off operation of said responsive switch means at a rate depending upon the heating load of the zone in which said responsive switch means is located, circuit means including said space switch means connecting said first heater of said bimetal and said actuator of each zone to said source of power whereby upon a call for heating by one of said zone responsive means said flow control means is opened and said bimetal actuator of said one zone is heated, circuit means connecting all of said normally open contacts in parallel to connect said control means to said source of power, and circuit means including said normally closed contacts connected in series to control the energization of said second heaters of all of said bimetals.

3. In a temperature control system for controlling the temperature independently in at least two spaces, a furnace for providing a source of heated air, control means for controlling the heat supplied to the air in said furnace, separate duct means connecting said furnace to each of said spaces, temperature responsive means for each space, flow control means mounted in each of said duct means for changing the rate of flow of air to each space, actuator means connected to each flow control means, a source of power, means including said responsive means of each space connecting said actuator means of a respective space to said source of power whereby said flow control means is controlled to allow a sufficient quantity of heated air to flow to said space to maintain a selected temperature, switch means for each space having an actuator, a normally closed circuit and a normally open circuit, said actuator having two energization means, said normally open circuit closing when one or both of said two energization means are energized a predetermined amount, means including said temperature responsive switch means of each space connecting a first of said two energization means of a respective space to said source of power, means including each of said normally open circuits connecting said control means to said source of power whereby upon the call for heat by one of said temperature responsive means said furnace is placed in operation to provide heated air, circuit means including said closed circuit of each actuator means connecting a second of said two energization windings of each actuator means in parallel to said source whereby upon the energization of one of said actuator means to energize said control means to heat air said other actuator means are biased out of control of said control means.

4. In a temperature control system for controlling the temperature independently in at least two spaces, a furnace for providing a source of heated air, control means controlling the heat supplied to the air in said furnace, separate duct means connecting said furnace to said spaces, temperature responsive means for each space, flow control means mounted in each of said duct means changing the rate of flow of air to each space, a source of power, means including said responsive means of each space connecting said flow control means of a respective space to said source of power whereby said flow control means is controlled to allow a sufficient quantity of heated air to flow to said space to maintain a selected temperature, switch means for each space having a first and second control circuits, an actuator means for controlling each of said switch means, said actuator means having two energization means whereby the output of said energization means modulately controls said actuator means, means including said temperature responsive means of each space connecting a first of said two energization means of a respective space to said source of power, means including each of said first circuits connecting said control means to said source of power whereby upon the call for heat by one of said temperature responsive means said furnace is placed in operation to provide heated air, and circuit means including said second circuits for connecting a second of said two energization means of each actuator means in parallel to said source of power whereby upon the energization of said control means to heat air by one of said actuator means said other actuator means are biased out of control.

5. In a temperature control system for controlling the temperature in a plurality of separate zones, conditioning means delivering a supply of heated medium to said zones, first means associated with each zone controlling the flow of said medium to each zone, temperature responsive means in each zone responsive to the heating load of each zone, means connecting each of said responsive means to said first means of a respective zone whereby the flow of medium is selected to satisfy the heating requirements of each zone, a thermal switch operator for each zone having two heating windings, means connecting each of said zone responsive means to control the energization of one heating winding for each of said switch operator of the respective zone, circuit means connecting all of said operators to control said conditioning means, and means associated with all of said switch operators connected in series with said second winding biasing the effect of said temperature responsive means on said means delivering heat whereby said other temperature responsive means are ineffective to influence said heat supply.

6. In a temperature control system for controlling the temperature in a plurality of separate zones, temperature conditioning means delivering a supply of temperature conditioned medium to said zones, flow control means associated with each zone controlling the flow of said medium to each zone, temperature responsive means in each zone responsive to a temperature conditioning load of each zone, means connecting each of said responsive means to said flow control means of a respective zone whereby the flow of medium to each zone is selected to satisfy the temperature conditioning requirements of each zone, a thermal switch operator for each zone having at least one heating winding and a switch associated therewith, said switch closing when said thermal operator reaches some predetermined temperature, circuit means connecting each of said zone temperature responsive means to control the energization of said heating winding of said switch operators of the respective zone, means connecting each of said switch operators to control said temperature conditioning means, and means associated with all of said switch operators adapted to modify the effect of said temperature responsive means on the control of said temperature conditioning means whereby one of said temperature responsive means of the zone having the greatest temperature conditioning load remains in control of said temperature conditioning means.

References Cited in the file of this patent
UNITED STATES PATENTS
2,949,234    Nessell _____ Aug. 16, 1960